United States Patent [19]

Bivens et al.

[11] Patent Number: 5,061,394

[45] Date of Patent: Oct. 29, 1991

[54] AZEOTROPIC COMPOSITION OF 1-CHLORO-1,2,2,2-TETRAFLUOROETHANE AND DIMETHYL ETHER

[75] Inventors: Donald B. Bivens, Kennet Square, Pa.; Akimichi Yokozeki, Greenville, Del.; Philip L. Bartlett, Wilmington, Del.; Joseph A. Creazzo, Wilmington, Del.

[73] Assignee: E. I. Du Pont de Nemours and Company, Wilmington, Del.

[21] Appl. No.: 492,964

[22] Filed: Mar. 13, 1990

[51] Int. Cl.$^5$ ............................ C09D 9/00; C09K 5/04
[52] U.S. Cl. ......................................... 252/171; 252/67; 252/305; 252/364; 252/DIG. 9; 252/DIG. 5; 521/98; 521/131; 521/181; 521/910
[58] Field of Search ................. 252/67, 171, 305, 364; 521/98, 131, 181, 910

[56] References Cited

U.S. PATENT DOCUMENTS

| | | | |
|---|---|---|---|
| 3,922,228 | 12/1976 | Hutchinson | 252/67 |
| 4,002,573 | 1/1977 | Hutchinson | 252/171 |
| 4,062,795 | 12/1977 | Hutchinson | 252/171 |
| 4,482,465 | 11/1984 | Gray | 252/67 |
| 4,543,202 | 9/1985 | Bartlett et al. | 252/305 |
| 4,585,577 | 4/1986 | Bartlett et al. | 252/305 |
| 4,595,522 | 6/1986 | Bartlett et al. | 252/305 |
| 4,612,133 | 9/1986 | Bertocchio et al. | 252/68 |
| 4,783,276 | 11/1988 | Bohnenn | 252/67 |

OTHER PUBLICATIONS

L. Bohnenn, "Update and Review of DME Propellant 1986," Aerosol Report, vol. 25, No. 3/86, Dupont Dymel Product Literature.

*Primary Examiner*—Morton Foelak
*Attorney, Agent, or Firm*—James E. Shipley

[57] ABSTRACT

The azeotrope of 1-chloro-1,2,2,2-tetrafluoroethane and dimethyl ether is useful as a refrigerant, aerosol propellant and polymer foam blowing agent.

6 Claims, No Drawings

AZEOTROPIC COMPOSITION OF 1-CHLORO-1,2,2,2-TETRAFLUOROETHANE AND DIMETHYL ETHER

BACKGROUND OF THE INVENTION

This invention relates to the azeotrope of 1-chloro-1,2,2,2-tetrafluoroethane (HCFC-124) and dimethyl ether (DME) and its use as a refrigerant, aerosol propellant and blowing agent for polymer foams.

This invention relates to mixtures of 1-chloro-1,2,2,2-tetrafluoroethane (HCFC-124) and dimethyl ether (DME). Such mixtures are useful as refrigerants, heat transfer media, gaseous dielectrics, foam expansion agents, aerosol propellants and power cycle working fluids. These mixtures are environmentally safe potential substitutes for dichlorotetrafluoroethane (CFC-114), which is the presently used refrigerant.

Closed-cell polyurethane foams are widely used for insulation purposes in building construction and in the manufacture of energy efficient electrical appliances. In the construction industry, polyurethane (polyisocyanurate) board stock is used in roofing and siding for its insulation and load-carrying capabilities. Poured and sprayed polyurethane foams are also used in construction. Sprayed polyurethane foams are widely used for insulating large structures such as storage tanks, etc. Pour-in-place polyurethane foams are used, for example, in appliances such as refrigerators and freezers plus they are used in making refrigerated trucks and railcars.

All of these various type of polyurethane foams require expansion agents (blowing agents) for their manufacture. Insulating foams depend on the use of halocarbon blowing agents, not only to foam the polymer, but primarily for their low vapor thermal conductivity, a very important characteristic for insulation value. Historically, polyurethane foams are made with trichlorofluoromethane (CFC-11) as the primary blowing agent.

A second important type of insulating foam is phenolic foam. These foams, which have very attractive flammability characteristics, are generally made with CFC-11 and 1,1,2-trichloro-1,2,2-trifluoroethane (CFC-113) blowing agents.

A third type of insulating foam is thermoplastic foam, primarily polystyrene foam. Polyolefin foams (polyethylene and polypropylene) are widely used in packaging. These thermoplastic foams are generally made with dichlorodifluoromethane (CFC-12) as the blowing agent.

Some refrigeration applications, rotary and centrifugal compressors for process cooling and air conditioning systems, presently use CFC-114 as the refrigerant. HCFC-124 is a halocarbon identified as a potential replacement for CFC-114, having properties near those of CFC-114, and being nonflammable with an ozone depletion potential of 0.02.

Many products designed for household, personal or industrial use are available as aerosol products. Typical examples of such products and ones in which the propellant system of the present invention can be used include personal products such as hair sprays, deodorants and colognes: household products such as waxes, polishes, pan sprays, room fresheners and household insecticides: industrial products such as cleaners, lubricants, and mold release agents: and automotive products such as cleaners and polishes. All such products utilize the pressure of a propellant gas or a mixture of propellant gases (i.e., a propellant gas system) to expel the active ingredients from the container. For this purpose, most aerosols employ liquified gases which vaporize and provide the pressure to propel the active ingredients when the valve on the aerosol container is pressed open.

An important physical property associated with the dispensing of aerosol products is the vapor pressure of the propellant. Vapor pressure from the viewpoint of this invention is the pressure exerted when a liquified propellant gas is in equilibrium with its vapor in a closed container, such as an aerosol can. Vapor pressure can be measured by connecting a pressure gauge to the valve on an aerosol can or gas cylinder containing the vapor/liquid mixture. A standard of measurement of vapor pressure in the U.S. aerosol industry is pounds per square inch gauge (psig) with the gas/liquid mixture at constant temperature, most commonly at 70° F. (21° C.). The vapor pressures of liquified gases most widely employed as aerosol propellants will vary over the range of about 20 to 90 psig (138 to 620 kPa) at 70° F. (21° C.). The propellant systems of the present invention have vapor pressures in this latter range.

In the early 1970's, concern began to be expressed that the stratospheric ozone layer (which provides protection against penetration of the earth's atmosphere by ultraviolet radiation) was being depleted by chlorine atoms introduced to the atmosphere from the release of fully halogenated chlorofluorocarbons. These chlorofluorocarbons are used as propellants in aerosols, as blowing agents for foams, as refrigerants and as cleaning/drying solvent systems. Because of the great chemical stability of fully halogenated chlorofluorocarbons, according to the ozone depletion theory, these compounds do not decompose in the earth's atmosphere but reach the stratosphere where they slowly degrade liberating chlorine atoms which in turn react with the ozone.

Concern reached such a level that in 1978 the U.S. Environmental Protection Agency (EPA) placed a ban on nonessential uses of fully halogenated chlorofluorocarbons as aerosol propellants. This ban resulted in a dramatic shift in the U.S. away from chlorofluorocarbon propellants (except for exempted uses) to primarily hydrocarbon propellants. However, since the rest of the world did not join the U.S. in this aerosol ban, the net result has been to shift the uses of chlorofluorocarbons in aerosols out of the U.S., but not to permanently reduce the world-wide total chlorofluorocarbon production, as sought. In fact, in the last few years the total amount of chlorofluorocarbons manufactured worldwide has exceeded the level produced in 1978 (before the U.S. ban).

During the period of 1978-1987, much research was conducted to study the ozone depletion theory. Because of the complexity of atmospheric chemistry, many questions relating to this theory remained unanswered. However, assuming the theory to be valid, the health risks which would result from depletion of the ozone layer are significant. This, coupled with the fact that world-wide production of chlorofluorocarbons has increased, has resulted in international efforts to reduce chlorofluorocarbon use. Particularly, in September, 1987, the United Nations through its Environment Programme (UNEP) issued a tentative proposal calling for a 50 percent reduction in world-wide production of fully halogenated chlorofluorocarbons by the year 1998. This proposal was ratified Jan. 1, 1989 and became effective on July 1, 1989.

Because of this proposed reduction in availability of fully halogenated chlorofluorocarbons such as CFC-11, CFC-12, CFC-113 and CFC-114, alternative, more environmentally acceptable, products are urgently needed.

As early as the 1970s with the initial emergence of the ozone depletion theory, it was known that the introduction of hydrogen into previously fully halogenated chlorofluorocarbons markedly reduced the chemical stability of these compounds. Hence, these now destabilized compounds would be expected to degrade in the lower atmosphere and not reach the stratosphere and the ozone layer. The accompanying Table lists the ozone depletion potential for a variety of fully and partially halogenated halocarbons. Halocarbon Global Warming Potential data (potential for reflecting infrared radiation (heat) back to earth and thereby raising the earth's surface temperature) are also shown.

OZONE DEPLETION AND HALOCARBON GLOBAL WARMING POTENTIALS

| Blowing Agent | Ozone Depletion Potential | Halocarbon Global Warming Potential |
|---|---|---|
| CFC-11 (CFCl$_3$) | 1.0 | 1.0 |
| CFC-12 (CF$_2$Cl$_2$) | 1.0 | 2.8 |
| HCFC-22 (CHF$_2$Cl) | 0.05 | 0.3 |
| HCFC-123 (CF$_3$CHCl$_2$) | 0.02 | 0.02 |
| HCFC-124 (CF$_3$CHFCl) | 0.02 | 0.09 |
| HFC-134a (CF$_3$CH$_2$F) | 0 | 0.3 |
| HCFC-141b (CFCl$_2$CH$_3$) | 0.1 | 0.09 |
| HCFC-142b (CF$_2$ClCH$_3$) | 0.06 | 0.3 |
| HFC-152a (CHF$_2$CH$_3$) | 0 | 0.03 |
| CFC-113 (CF$_2$Cl—CFCl$_2$) | 0.8–0.9 | 1.4 |
| CFC-114 (CF$_2$Cl—CF$_2$Cl) | 0.6–0.8 | 3.7 |

HCFC-124 has an ozone depletion potential of 0.02. Dimethyl ether, having no halogen content, is a zero ozone depleter.

Although HCFC-124 has utility as a refrigerant, aerosol propellant or foam blowing agent, an azeotrope offers the possibility of producing more economical nonfractionating systems with improved properties such as polymer and refrigerant oil solubility.

Unfortunately, as recognized in the art, it is not possible to predict the formation of azeotropes.

This fact obviously complicates the search for new azeotropes which have application in the field. Nevertheless, there is a constant effort in the art to discover new azeotropic compositions, which have desirable characteristics.

SUMMARY OF THE INVENTION

In accordance with the present invention, azeotropic and other mixtures have been discovered, which consist essentially of 1-chloro-1,2,2,2-tetrafluoroethane (HCFC-124) and dimethyl ether (DME). Included among the invention mixtures is an azeotrope with the composition 83.2 to 90.2 weight percent HCFC-124 and 9.8 to 16.8 weight percent DME at 25° C.

For the purpose of this discussion, azeotropic or constant boiling is intended to mean also essentially azeotropic or essentially constant boiling. In other words, included within the meaning of these terms are not only the true azeotrope described above, but also other compositions containing the same components in different proportions, which are true azeotropes at other temperatures and pressures, as well as those equivalent compositions which are part of the same azeotropic system and are azeotrope-like in their properties. As is well recognized in this art, there is a range of compositions which contain the same components as the azeotrope, which not only will exhibit essentially equivalent properties for refrigeration and other applications, but which will also exhibit essentially equivalent properties to the true azeotropic composition in terms of constant boiling characteristics or tendency not to segregate or fractionate on boiling.

The azeotropic and substantially constant boiling azeotropic compositions of the invention are useful as refrigerants, expansion agents and as aerosol propellants, among other applications. They have refrigeration energy efficiency performance better than that of HCFC-124 alone.

As used herein "an azeotropic composition consisting essentially of" is intended to include mixtures which contain all the components of the azeotrope of this invention (in any amounts) and which, when fractionally distilled, would produce an azeotrope containing all the components of this invention in at least one fraction, alone or in combination with another compound, e.g., one which distills at substantially the same temperature as said fraction.

Mixtures of HCFC-124 and DME may be formulated such that they are nonflammable. Therefore, also included among the compositions of this invention are the nonflammable compositions.

Another aspect of the invention is a refrigeration method which comprises condensing a refrigerant composition of the invention (HCFC-124 and DME) and thereafter evaporating it in the vicinity of a body to be cooled. Similarly, still another aspect of the invention is a method for heating which comprises condensing the invention refrigerant in the vicinity of a body to be heated and thereafter evaporating the refrigerant. A further aspect of the invention involves aerosol compositions comprising an active agent and a propellant, wherein the propellant is an azeotropic mixture of the invention, and the production of these compositions by combining said ingredients.

Preferably in the heating and cooling applications, the nonflammable compositions will contain at least about 92.0 weight percent HCFC-124.

These azeotropic and substantially constant boiling azeotropic compositions are useful as propellants for aerosol sprays, e.g. room fresheners. The azeotropes are particularly attractive as they do not separate or fractionate when used in aerosol packages equipped with vapor tap valves wherein the propellant is removed, at least partially, vapor phase.

The HCFC-124/DME azeotropic and constant boiling compositions are excellent blowing agents for polyurethane, phenolic and polystyrene foam.

The novel azeotropic composition of the invention was discovered during a phase study wherein the compositions were varied and vapor pressures measured. The azeotropic composition occurred at the minimum point of the vapor pressure-concentration plot, being at 86.7 weight percent HCFC-124 and 13.3 weight percent DME at 25° C. (±3.5 weight percent). The azeotrope has an atmospheric pressure boiling point of −8° C., compared with −11° C. for HCFC-124 and −24.6° C. for DME.

The nonflammable mixtures of this invention consist essentially of effective amounts of HCFC-124 and DME within the range of about 92.0 to 99.5 weight percent of HCFC-124 and 0.5 to 8.0 weight percent of DME. More usually, for purposes of the invention, the mixtures will contain from about 40.0 to 99.5 weight percent of HCFC-124, the remainder being DME.

The binary compositions of the invention can be used to improve the refrigeration energy efficiency of HCFC-124, which has been identified as a potential replacement for CFC-114 in refrigeration applications. The new refrigerant mixtures can be used in refrigeration applications as described in U.S. Pat. No. 4,482,465 to Gray.

As stated above, the preferred binary HCFC-124/DME compositions are essentially nonflammable. By nonflammable is meant a gas mixture in air will not burn when subjected to a spark igniter as described in "Limits of Flammability of Gases and Vapours," Bulletin 503, H. F. Coward, et al., Washington, U.S. Bureau of Mines, 1952.

The HCFC-124/dimethyl ether azeotrope of the invention has a vapor pressure at 70° F. (21° C.) of about 30 psig (207 kPa). This vapor pressure makes the azeotrope attractive and useful as an aerosol propellant.

The HCFC-124/dimethyl ether azeotrope does not plasticize polystyrene. Thus the azeotrope and more particularly, the nonflammable mixtures of HCFC-124 and dimethyl ether are excellent blowing agents for polystyrene.

Additionally, the HCFC-124/dimethyl ether azeotrope is soluble in polyurethane polyols.

The compositions of the instant invention can be prepared by any convenient method including mixing or combining, by other suitable methods, the desired amounts of the components, using techniques well-known to the art. Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, are hereby incorporated by reference.

EXAMPLES

Example 1

A phase study is made on HCFC-124 and dimethyl ether wherein the composition is varied and the vapor pressures measured, at a temperature of 25° C. An azeotropic composition is obtained as evidenced by the minimum vapor pressure observed and is identified as 86.7 weight percent HCFC-124 and 13.3 weight percent dimethyl ether. (±3.5 weight percent).

Example 2

An evaluation of the refrigeration properties of the mixtures of the invention versus CFC-114 and HCFC-124, respectively, are shown in Table I. The data are generated on a one ton basis, that is to say, on the removal of heat from a space at the rate of 12,000 Btu/hr ($12.7 \times 10^6$ J/hr). The data are based on the ideal refrigeration cycle.

TABLE I

COMPARISON OF REFRIGERATION PERFORMANCES

| | | | Weight Percentages | |
|---|---|---|---|---|
| | CFC-114 | HCFC-124 | 86.7% HCFC-124 13.3% DME | 92% HCFC-124 8% DME |
| Evaporator Temp., °F. | 30.0 | 30.0 | 30.0 | 30.0 |
| °C. | (−1.1) | (−1.1) | (−1.1) | (−1.1) |
| Evaporator Press., psia | 12.1 | 22.0 | 19.8 | 20.1 |
| (kPa) | (83) | (152) | (137) | (139) |
| Condenser Temp., °F. | 100.0 | 100.0 | 100.0 | 100.0 |
| °C. | (38) | (38) | (38) | (38) |
| Condenser Press., psia | 45.6 | 80.0 | 73.7 | 74.8 |
| (kPa) | (314) | (552) | (508) | (516) |
| Superheat, °F. | 20.0 | 20.0 | 20.0 | 20.0 |
| °C. | (−6.7) | (−6.7) | (−6.7) | (−6.7) |
| Subcool, °F. | 0 | 0 | 0 | 0 |
| °C. | (−18) | (−18) | (−18) | (−18) |
| Coefficient of Performance | 5.49 | 5.51 | 5.67 | 5.60 |
| Compressor Displacement, | | | | |
| Ft.$^3$/min/ton | 11.93 | 6.65 | 6.97 | 6.99 |
| (m$^3$/sec/Kg) | (5108) | (2847) | (2984) | (2993) |

Coefficient of Performance (COP) is a measure of refrigerant energy efficiency.

For a refrigeration cycle typified by the above conditions, the COP of the 86.7/13.3 weight percent HCFC-124/DME azeotrope represents better energy efficiency than CFC-114 or HCFC-124. This azeotropic mixture is flammable.

The 92/8 weight percent HCFC-124/DME mixture has a COP which is also better than that of CFC-114 and HCFC-124. This composition will be nonflammable at temperatures less than 80° C.

Additives such as lubricants, corrosion inhibitors, stabilizers, dyes and other appropriate materials may be added to the novel compositions of the invention for a variety of purposes provided they do not have an adverse influence on the composition, for their intended applications.

Example 3

An aerosol room freshener is prepared with the HCFC-124/dimethyl ether azeotrope (86.7/13.3). The formulation and vapor pressure are shown in Table II.

TABLE II

| AEROSOL ROOM FRESHENER FORMULATION | |
|---|---|
| Ingredient | Wt. % |
| Perfume | 2.0 |
| HCFC-124/ Dimethyl ether (86.7/13.3) | 98.0 |
| Vapor Pressure at 70° F. (21° C.), psig (kPa) | 30.0 (207) |

Example 4

The solubility of the HCFC-124/dimethyl ether azeotrope (86.7/13.3) is determined in a polyurethane polyol. The azeotrope is readily soluble at 30.0 weight percent. The solubility data are summarized in Table III.

TABLE III

| SOLUBILITY OF HCFC-124/DIMETHYL ETHER AZEOTROPE IN POLYOL | | |
|---|---|---|
| Blowing Acent | Wt. % in Polyol* | Appearance |
| HCFC-124 | 30.0 | Soluble, single phase |
| HCFC-124/Dimethyl ether (86.7/13.3) | 30.0 | Soluble, single phase |

*"Stepanpol" PS-2852 (Stepan Company) an aromatic polyester polyol.

Example 5

The solubility of the HCFC-124/dimethyl ether azeotrope (86.7/13.3) in polystyrene was determined by combining a piece of polystyrene (about 2.5 cm long, 0.5 cm wide and 0.5 cm thick) with about 50 g. azeotrope. Both HCFC-124 and the HCFC-124/dimethyl ether azeotrope (86.7/13.3) had little or no solvency for polystyrene, producing no plasticization of the thermoplastic polymer.

The data are summarized in Table IV.

TABLE IV

| SOLUBILITY OF HCFC-124/DIMETHYL ETHER AZEOTROPE (86.7/13.3) IN POLYSTYRENE | |
|---|---|
| Blowing Agent | Appearance of Polystyrene |
| HCFC-124 | No effect |
| HCFC-124/Dimethyl ether azeotrope (86.7/13.3) | No effect |

Example 6

The quantity of HCFC-124 required in the vapor space above blends of HCFC-124 and dimethyl ether for nonflammability is determined. The test conditions and results are summarized in Table V.

TABLE V

| NONFLAMMABLE BLEND OF HCFC-124/DIMETHYL ETHER Ignition Source: 3-mil copper exploding wire (110 Volts) | | |
|---|---|---|
| | Temperature | |
| | 80° C. | 150° C. |
| Quantity of HCFC-124 required for nonflammability* | greater than 92 wt. % | greater than 98 wt. % |

*In HCFC-124/dimethyl ether vapor mixtures in air.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A binary azeotropic mixture consisting essentially of about 40.0 to 99.5 weight percent 1-chloro-1,2,2,2-tetrafluoroethane and the remainder being dimethyl ether.

2. A nonflammable binary azeotropic mixture of claim 1 consisting essentially of about 92.0 to 99.5 weight percent of 1-chloro-1,2,2,2-tetrafluoroethane and 8.0 to 0.5 weight percent dimethyl ether.

3. A composition of claim 1 consisting essentially of about 83.2 to 90.2 weight percent 1-chloro-1,2,2,2-tetrafluoroethane and 9.8 to 16.8 weight percent dimethyl ether.

4. A composition of claim 3 consisting essentially of about 86.7 weight percent 1-chloro-1,2,2,2-tetrafluoroethane and about 13.3 weight percent dimethyl ether.

5. The composition of claim 1, consisting of about 40.0 to 99.5 weight percent 1-chloro-1,2,2,2-tetrafluoroethane and the remainder being dimethyl ether.

6. The composition of claim 1, wherein if said mixture is fractionally distilled it would produce an azeotrope containing only 1-chloro-1,2,2,2-tetrafluoroethane and dimethyl ether in at least one fraction.

* * * * *